United States Patent Office 3,546,205
Patented Dec. 8, 1970

3,546,205
STABILIZING METHOD AND THE PREPARATION STABILIZED THEREBY
Naoki Hotta and Akira Namiuchi, Tokyo, and Masahiko Arita, Yamato-machi, Saitama-ken, Japan, assignors to Chugai Seiyaku Kabushiki Kaisha, Tokyo, Japan, a corporation of Japan
No Drawing. Filed Apr. 3, 1968, Ser. No. 718,349
Claims priority, application Japan, Apr. 6, 1967, 42/21,528
Int. Cl. C07c 69/68
U.S. Cl. 260—209
16 Claims

ABSTRACT OF THE DISCLOSURE

D-glucaro-1,4-lactone or a salt thereof is stabilized by adding methionine as a stabilizer, preferably in the presence of $SO_3$— ion to yield a product which is suitable for use in drug manufacturing.

---

This invention relates to a method of stabilizing D-glucaro-1,4-lactone (also called D-glucosaccharo-1,4-lactone) or a salt thereof, particularly of D-glucaro-1,4-lactone or a salt thereof in solid form, and the resultant preparation.

An object of this invention is to provide a method of stabilizing D-glucaro-1,4-lactone or a salt thereof in solid form. Another object of this invention is to provide a stable solid preparation of D-glucaro-1,4-lactone or a salt thereof suitable for drug manufacturing.

It is known that D-glucaro-1,4-lactone and the salts thereof have an inhibitory action of β-glucuronidase and that they have recently been considered attractive as specific anti-cancer agents and also as anti-inflammatory agents, but that they are unsuitable for medicine because they are unstable in the presence of moisture or heat with the result that they degrade by the cleavage of the lactone-ring, change in coloration to yellow or brown and/or contraction in volume.

Various additives have now been studied to overcome these disadvantageous properties of D-glucaro-1,4-lactone and its salts. Various additives, for example, amino acids such as glycine, valine, lysine, hystidine, glutamic acid, cystein or methionine, salts such as potassium metabisulfite, acid sulfites or sulfites, organic acids such as citric acid or tartaric acid, urea, thiourea, taurine or nicotinamide were added to D-glucaro-1,4-lactone or it salts, and it has now been found that all of the substances, except methionine, show no stabilizing effect, but that only methionine stabilizes D-glucaro-1,4-lactone and its salts.

According to the present invention, D-glucaro-1,4-lactone or a salt thereof is stabilized by adding methionine as a stabilizer to D-glucaro1,4-lactone or a salt thereof and the stabilizing effect can be increased in the co-existence of $SO_3$— ion.

In more detail, the stabilizer is efficiently added, for example, as follows: (1) mixing methionine powder with D-glucaro-1,4-lactone or a salt thereof in solid form; (2) adding methionine to an aqueous solution of already isolated D-glucaro-1,4-lactone or a salt thereof and recovering the solutes. The recovery is carried out, for example, by adding an organic solvent which is miscible with water but which decreases the solubility of D-glucaro-1,4-lactone and its salts, for example, methanol, ethanol or acetone, thereby causing the solutes to precipitate, or by freeze-drying or spray-drying of the solution. (3) Methionine may also be added to hte D-glucaro-1,4-lactone mother liquor so that when the lactone is formed, it already contains the methionine, then adding a water miscible organic solvent which decreases the solubility of D-glucaro-1,4-lactone in order to yield precipitations, recovering the precipitations and drying.

All of dl-, d- and l- form of methionine are effectively used in this invention and the amount to be added is at least such an amount as corresponding to 5%, generally 5–20% by weight, of the weight of D-glucaro-1,4-lactone or a salt thereof. The presence in the composition of $SO_3$— ion is more favourable for the prevention of discoloration than the case of using methionine only, and is especially effective in the presence of moisture. As the compound which forms $SO_3$— ion in the liqueous state, for example, sulfites, thiosulfates, hydrosulfites, acid bisulfites, metabisulfite, rongalit (i.e., formaldehyde sodium sulfoxylate) or the like may be used. The $SO_3$— ion suppliers are preferably added in such an amount as corresponding to 1–20% by weight of D-glucaro-1,4-lactone or its salt present.

As a salt of D-glucaro-1,4-lactone, there are, for example, sodium-salt, potassium salt and the like. The existence of D-glucaric acid of the 6,3-lactone thereof, which are equivalent with D-glucaro-1,4-lactone in a liqueous state, does not affect the stabilizing effect.

Experimental data regarding the present invention are shown below:

*Experiment.*—Samples were prepared in accordance with the procedures of I–V as follows:

(I) D-glucaro-1,4-lactone or a salt thereof and stabilizer were dissolved in 0.6 ml. of distilled water and the solution was freeze-dried and put into 10 ml.-vial with stopper.

(II) D-glucaro-1,4-lactone or a salt thereof in the powder form and stabilizer powder were mixed in a mortar and the mixture was put into 10 ml.-vial with stopper.

(III) D-glucaro-1,4-lactone or a salt thereof and stabilizer were dissolved in an adequate volume of distilled water and several times volume of ethanol was added to the solution. Crystals formed were collected, dried and put into 10 ml.-vial with stopper.

(IV) To the reaction mixture which resulted from the reaction of D-glucaro-1,4-lactone and sodium hydroxide in an adequate volume of methanol was added stabilizer, and crystals formed were collected, dried and put into 10 ml.-vial with stopper.

(V) D-glucaro-1,4-lactone and sodium bicarbonate were dissolved in an adequate volume of distilled water and stabilizer was added to the solution, followed by the addition of several times volume of ethanol to give crystals. The crystals were collected, dried and put into 10 ml.-vial with stopper.

Samples containing D-glucaro-1,4-lactone or a salt thereof without the stabilizer additive were prepared in a similar manner as described above.

Coloration, content of D-glucaro-1,4-lactone or its salt and inhibitory action of β-glucuronidase of the sample before or after thermal treatment for acceleration were determined in the following method.

*Coloration.*—Percent transmission was measured at 420 mμ in 1.5% sample solution.

*Content of D-glucaro-1,4-lactone or a salt thereof.*— Sample was cooled and the amount of free acid was determined by alkali-titration using 0.1 N NaOH. Then, excess amount of the alkali was added to the solution and back titration was carried out with acid, 0.1 N HCl. The content of D-glucaro-1,4-lactone or a salt thereof was shown by the value substracted the former value, i.e., the amount of free acids, from the latter value; the values in the table show remaining ratio of D-glucaro-1,4-lactone or a salt thereof, setting the value before thermal treatment 100.

*Inhibitory action of β-glucuronidase.*—Inhibitory action of β-glucuronidase was determined in accordance with the method disclosed in G. A. Levy: Biochem. J. 52 464–472 (1952).

$10 \times 10^{-6}$ M-D-glucaro-1,4-lactone solution and a salt thereof were prepared exactly and they were diluted serially to 1:2, 1:4, 1:8 and 1:16. To 1 ml. of 0.5 M acetate buffer, pH 5.2, and 0.5 ml. of 0.001 M phenolphthlein monoglucuronide solution (produced by Chugai Seiyaku K. K.) in a 10 or 15 ml. centrifuge tube were added 2 ml. water (control) or the above D-glucaro-1,4-lactone or a salt thereof solution. The tube was immediately placed in a bath at 37° C., and 0.5 ml. 1:100 dilution of enzyme (prepared by Tokyo Zoki Kagaku K. K., 13,000 units/ml.) was run in. After 1 hour, 4 ml. glycine-NaOH buffer, pH 10.5, were added and mixed well. Then, absorption of the mixture was measured at 550 mμ. The logarithm of the concentration of D-glucaro-1,4-lactone or a salt thereof was plotted along the abscissa, and inhibition (percent) was plotted along the ordinate. The inhibitory activity was compared in molarity of 50% inhibition. The values show remaining ratio of the inhibitory activity, setting the value before thermal treating 100%.

The results are shown in Table I.

TABLE I

| Samples | | Moisture, percent | Preparation method | Thermal condition | Coloration transmission, percent | Content of D-glucare-1,4-lactone or a salt thereof, percent | Inhibitory activity of β-glucuronidase, percent | Appearance* |
|---|---|---|---|---|---|---|---|---|
| D-glucaro-1,4-lactone or a salt thereof | Stabilizer | | | | | | | |
| Sodium D-glucarate-1,4-lactone, 100 mg | None | 6.8 | I | 50° C., 6 days | 42.8 | 72.3 | 63.0 | ++ |
| | l-methionine, 8 mg | | | | 97.0 | 97.5 | 100.0 | – |
| | l-methionine, 8 mg.; sodium bisulfite, 10 mg | | | | 100.0 | 98.0 | 98.5 | – |
| Potassium D-glucarate-1,4-lactone, 100 mg | None | 7.0 | I | 50° C., 6 days | 43.0 | 71.0 | 65.0 | ++ |
| | dl-methionine, 7 mg | | | | 95.3 | 96.5 | 97.0 | – |
| D-glucaro-1,4-lactone, 100 mg | None | 6.7 | I | 50° C., 6 days | 46.0 | 79.0 | 69.0 | ++ |
| | l-methionine, 8 mg | | | | 97.0 | 99.0 | 98.9 | – |
| | l-methionine, 8 mg.; sodium sulfite, 3 mg | | | | 100.0 | 99.1 | 99.0 | – |
| Sodium D-glucarate-1,4-lactone, 100 mg | None | 14.0 | II | do | 76.0 | 60.5 | 62.3 | – |
| | l-methionine, 8 mg | | | | 95.0 | 98.0 | 99.0 | – |
| | l-methionine, 8 mg.; sodium sulfite, 10 mg | | | | 100.0 | 99.0 | 99.1 | – |
| Sodium D-glucarate-1,4-lactone, 100 mg | None | 0.8 | II | 60° C., 10 days | 93.0 | 91.5 | 93.0 | – |
| | dl-methionine, 6 mg | | | | 98.5 | 98.7 | 97.6 | – |
| | dl-methionine, 6 mg.; potassium metabisulfite, 5 mg | | | | 100.0 | 98.9 | 98.0 | – |
| Sodium D-glucarate-1,4-lactone, 100 mg | None | 9.0 | III | 50° C., 6 days | 74.0 | 50.0 | 45.0 | – |
| | dl-methionine, 8 mg | | | | 94.5 | 96.5 | 97.5 | – |
| Potassium D-glucarate-1,4-lactone, 100 mg | None | 8.0 | III | 50° C., 6 days | 75.2 | 55.0 | 46.0 | – |
| | d-methionine, 7 mg | | | | 90.0 | 95.2 | 96.0 | – |
| | d-methionine, 7 mg.; potassium metabisulfite, 5 mg | | | | 100.0 | 96.3 | 97.0 | – |
| D-glucaro-1,4-lactone, 100 mg; sodium hydroxide, 19 mg | None | 0.6 | IV | do | 76.0 | 56.0 | 47.0 | – |
| | l-methionine, 7 mg | | | | 96.0 | 97.5 | 100.0 | – |
| D-glucaro-1,4-lactone; 100 mg; sodium bicarbonate, 38 mg | None | 14.0 | V | do | 40.0 | 40.0 | 30.0 | – |
| | l-methionine, 7 mg | | | | 86.0 | 80.1 | 72.0 | – |

*++ = Much contraction of volume; – = No contraction of volume.

D-glucaro-1,4-lactone or a salt thereof is thus stabilized by adding methionine as a stabilizer, preferably in the presence of $SO_3{=}$ ion and the preparation is stable and suitable for drug manufacturing.

The invention is illustrated but not limited by the following examples.

EXAMPLE 1

Ten grams of sodium D-glucarate-1,4-lactone were dissolved in distilled water and 0.8 g. of l-methionine was added to the solution, followed by adjusting the volume to 300 ml. After filtration with a membrane filter (0.45μ), the solution was placed into 10 ml-vials aseptically, 3 ml. in each, and freeze-dried.

EXAMPLE 2

Ten grams of potassium D-glucarate-1,4-lactone, 0.8 g. of d-methionine and 0.2 g. of potassium metabisulfite were dissolved in 30 ml. of distilled water and the solution was freeze-dried.

EXAMPLE 3

Ten grams of D-glucaro-1,4-lactone, 0.7 g. of l-methionine and 1.0 g. of sodium bisulfite were disolved in 300 ml. of distilled water. After filtration with membrane filter (0.45μ), the solution was put into 10 ml.-vial aseptically by 3 ml. each and freeze-dried.

EXAMPLE 4

After 10 g. of sodium D-glucarate-1,4-lactone, 0.7 g. 0.8 g. of l-methionine were dissolved in 10 ml. of distilled water, 30 ml. of ethanol was added to the solution to give the crystals. The crystals were collected by filtration, washed with absolute ethanol and dried.

EXAMPLE 5

After 10. g. of sodium D-glucarate-1,4-lactone, 0.7 g. of l-methionine and 0.5 g. of sodium sulfite were dissolved in 10 ml. of distilled water, 5 times volume of absolute ethanol was added to the solution to form crystals. The crystals were collected by filtration and refluxed for an hour with 4 times volume of acetone and dried.

EXAMPLE 6

Ten grams of potassium D-glucarate-1,4-lactone and 0.8 g. of dl-methionine and 1g. of potassium bisulfite were dissolved in distilled water and the solution was spray-dried.

EXAMPLE 7

Ten grams of potassium D-glucarate-1,4-lactone, 0.8 g. of l-methionine were mixed well in a mortar.

EXAMPLE 8

Ten grams of D-glucaro-1,4-lactone and 0.5 g. of d-methionine were mixed and the mixture was passed through micronizer.

EXAMPLE 9

Ten grams of sodium D-glucarate-1,4-lactone, 0.6 g. of dl-methionine and 1.0 g. of sodium metabisulfite were mixed well in a mortar.

EXAMPLE 10

Twenty-one grams of D-glucaro-1,4-lactone was dissolved in 210 ml. of methanol and sodium hydroxide solution, which was separately prepared by dissolving 4 g. of sodiumhydroxide in 200 ml. of methanol, was dropped in the solution to yield sodium D-glucarate-1,4-lactone. 1.5 g. of l-methionine was added to the reaction mixture and the mixture was stirred. The crystals deposited were collected by filtration, washed with methanol and dried.

EXAMPLE 11

Twenty-one grams of D-glucaro-1,4-lactone was dissolved in 42 ml. of distilled water and 8 g. of sodium bicarbonate was added little by little to the solution to yield sodium D-glucarate-1,4-lactone. After 1.5 g. of l-methionine was added to the reaction mixture and the mixture was stirred, 210 ml. of absolute ethanol was dropped in the mixture. Crystals formed were collected by filtration, washed with ethanol and dried.

It will be obvious to those skilled in the art that various changes may be made without departing from the scope of the invention and the invention is not to be considered to what is described in the specification.

What is claimed is:

1. A stable solid preparation consisting essentially of D-glucaro - 1,4 - lactone and at least 5% by weight of methionine stabilizer based on the lactone.

2. A stable solid preparation of D-glucaro-1,4-lactone as claimed in claim 1, in which the amount of methionine is at least such an amount as corresponding to 5–20% by weight based on D-glucaro-1,4-lactone.

3. A stable solid preparation of D-glucaro-1,4-lactone as claimed in claim 1, further including a compound which forms $SO_3{=}$ ion in an aqueous state said compound being selected from the group consisting of sulfites, thiosulfates, hydrosulfites, acid bisulfites, metabisulfites and rongalit.

4. A stable solid preparation of D-glucaro-1,4-lactone as claimed in claim 3, in which the amount of the compound which forms $SO_3{=}$ ion is 5–20% by weight based on D-glucaro-1,4-lactone.

5. A stable solid preparation of D-glucaro-1,4-lactone as claimed in claim 1, in which D-glucaro-1,4-lactone is a salt selected from the group consisting of sodium D-glucarate - 1,4-lactone and potassium D-glucarate-1,4-lactone.

6. A method of stabilizing D-glucaro-1,4-lactone in a soild form which comprises adding methionine as a stabilizer in at least such an amount as coresponding to 5% by weight of D-glucaro-1,4-lactone.

7. A method of stabilizing D-glucaro-1,4-lactone in a solid form as claimed in claim 6, in which the amount of methionine to be added is 5–20% by weight based on the D-glucaro-1,4-lactone.

8. A method of stabilizing D-glucaro - 1,4-lactone in solid form as claimed in claim 6, which comprises mixing methionine powder with D-glucaro-1,4-lactone in a solid form.

9. A method of stabilizing D-glucaro-1,4-lactone in a solid form as claimed in claim 6, which comprises adding methionine to an aqueous solution of D-glucaro - 1,4-lactone and freeze-drying the solution.

10. A method of stabilizing D-glucaro-1,4-lactone in a solid form as claimed in claim 6, which comprises adding methionine to an aqueous solution of D-glucaro-1,4-lactone and spray-drying the solution.

11. A method of stabilizing D-glucaro-1,4-lactone in a solid form as claimed in claim 6 which comprises adding methionione to an aqueous solution of D-glucaro-1,4-lactone, adding such a water miscible organic solvent which decreases the solubility of D-glucaro-1,4-lactone thereby yielding precipitations, recovering the preciiptations and drying.

12. A method of stabilizing D-glucaro-1,4-lactone in a solid form as claimed in claim 11, in which said organic solvent is a member selected from the group consisting of methanol, ethanol and acetone.

13. A method of stabilizing D-glucaro-1,4-lactone in a solid form as claimed in claim 6, which comprises adding methionine to mother liquor for the deposition of D-glucaro-1,4-lactone, adding a water miscible organic solvent which decreases the solubility of D-glucaro - 1,4-lactone thereby yielding precipitations, recovering the precipitations and drying.

14. A method of stabilizing D-glucaro-1,4-lactone in a solid form as claimed in claim 13, in which said organic solvent is a member selected from the group consisting of methanol, ethanol and acetone.

15. A method of stabilizing D-glucaro-1,4-lactone as claimed in claim 6, in which said D-glucaro-1,4-lactone is a salt selected from the group consisting of sodium D-glucarate - 1,4 - lactone and potassium D-glucarate-1,4-lactone.

16. A method of stabilizing D-glucaro-1,4-lactone in a solid form as claimed in claim 6, further comprising adding 1–20% by weight of said lactone of a compound selected from the group consisting of sulfites, thiosulfates, hydrosulfites, acid bisulfites, metabisulfies and rongalit.

References Cited

UNITED STATES PATENTS 3,089,869  5/1963  Mauvernay _____ 260—211,5

OTHER REFERENCES

Bingham et al.: "Chem. Abst." vol. 65, 1966, p. 5994(e).

LEWIS GOTTS, Primary Examiner

JOHNNIE R. BROWN, Assistant Examiner

U.S. Cl. X.R.

260—210, 211; 424—180

UNITED STATES PATENT OFFICE
CERTIFICATE OF CORRECTION

Patent No. 3,546,205      Dated December 8, 1970

Inventor(s) Naoki Hotta et al.

It is certified that error appears in the above-identified patent and that said Letters Patent are hereby corrected as shown below:

Column 1, line 69 change "hte" to --the--;

Column 2, line 68 change "substracted" to --subtracted--

Column 3, middle column, line 1, change "phenolphthlein" to --phenolphthalein--;

Column 3, middle column, line 6 after "enzyme" insert --solution--;

Column 5, Example 4, line 30, delete --0.7 g.--;

Column 6, line 39 change "coresponding" to --correspondi

Column 7, claim 16, line 15, change "metabisulfies" to --metabisulfites--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents